March 26, 1946. G. H. ENNIS 2,397,254
METHOD AND APPARATUS FOR ELECTRICALLY CORING IN CASED BORE HOLES
Filed June 28, 1935 3 Sheets-Sheet 1
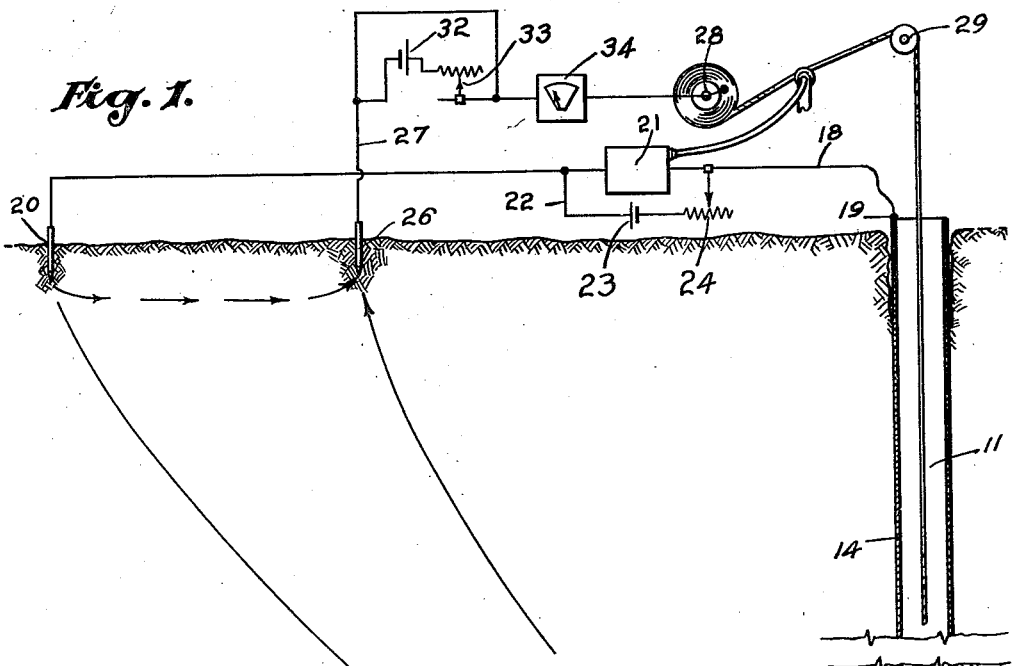
Fig. 1.
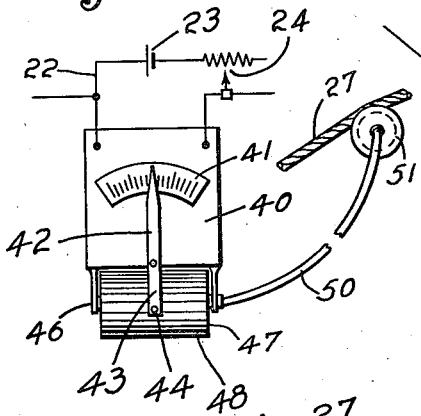
Fig. 2.
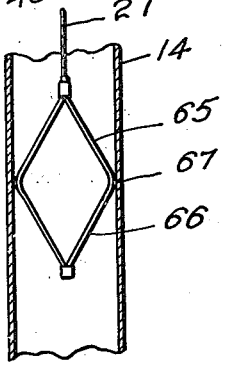
Fig. 4.
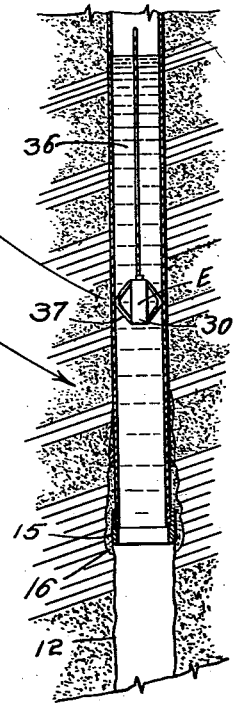
INVENTOR
GEORGE H. ENNIS
ATTORNEY March 26, 1946. G. H. ENNIS 2,397,254
METHOD AND APPARATUS FOR ELECTRICALLY CORING IN CASED BORE HOLES
Filed June 28, 1935 3 Sheets-Sheet 2

INVENTOR
GEORGE H. ENNIS
ATTORNEY

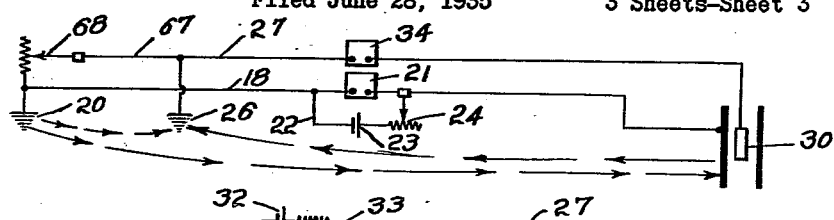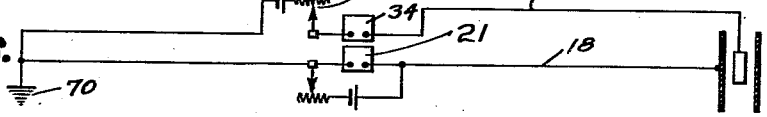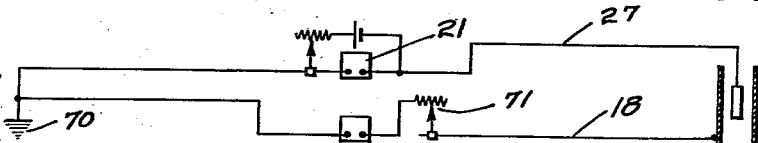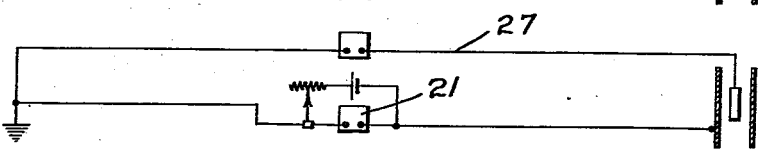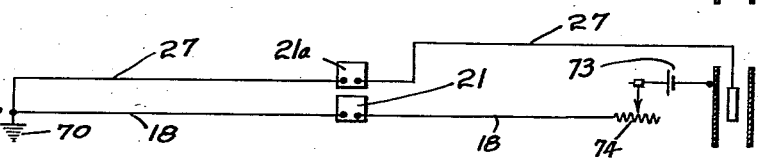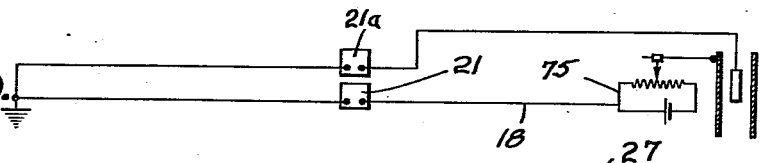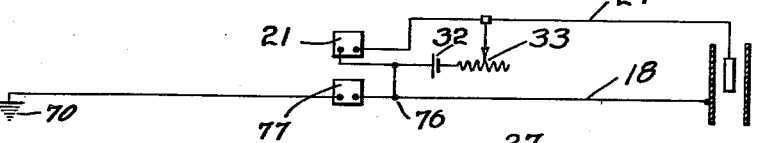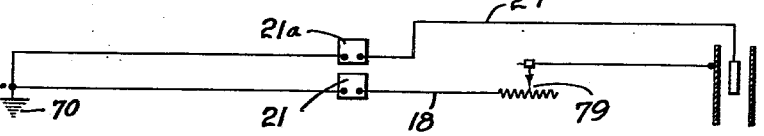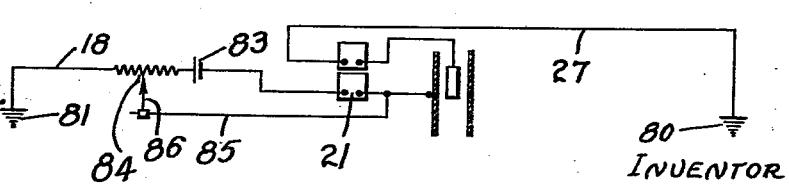

Patented Mar. 26, 1946

2,397,254

UNITED STATES PATENT OFFICE 2,397,254

METHOD AND APPARATUS FOR ELECTRICALLY CORING IN CASED BOREHOLES

George H. Ennis, Long Beach, Calif., assignor of one-half to Robert V. Funk, Long Beach, Calif.

Application June 28, 1935, Serial No. 28,891

14 Claims. (Cl. 175—182)

My invention relates to a method of and apparatus for determining the formations and their locations in wells bored in the earth, and in which the well casing has already been installed.

In describing and illustrating the various features, advantages, and objects of my invention I will refer to its use in the oil well industry where it is of considerable utility and value. It should be understood, however, that my invention may be used in conjunction with any bore hole having a metal casing or sheath installed therein in which it is desired to locate the various strata. My invention is new not only in its entirety but also in its several subcombinations, parts of the apparatus; and in the steps of the process which I have developed, and I therefore desire patent protection not only on the method and apparatus as a whole but on the several elements, or parts, or steps which compose the whole.

In practically every oil field there are numerous layers of oil sands or oil bearing formations separated by layers of shale or rock and also separated by water sands. The most productive high pressure oil bearing formations are usually below the more shallow oil sands, and in order to obtain maximum production it is the usual practice to drill through the more shallow oil sands to the high pressure formations. In order to shut off all of the other formations above the one which is being produced, a well casing is installed in the well, this well casing having a shoe on the lower end which is cemented to a shale or rock formation immediately above the formation being produced.

When the high pressure oil bearing formation becomes depleted it is the practice to cement off the depleted formation and to perforate the casing at a point opposite one of the more shallow oil sands to obtain whatever oil is present in such more shallow oil sands. This, of course, can be done only when the location of the more shallow oil sand is known.

Prior to 1927 the only information available pertaining to the location of shales and sands in oil wells was obtained through what was termed a driller's log of the well. This information is unreliable and inefficient due to the fact that it is impossible to determine the character of the formation by the feel of the drill when it is passing through the various kinds of formations. There are many things that can and do enter into the accuracy of the driller's log which, in most cases, is of very little value in determining where shales and oil sands are located.

In 1927 the core barrel was introduced and, at great expense, was run in combination with the oil well drill. It was intended to bring to the surface a core of the formation being penetrated. While this was a great improvement, usually the percentage of core recovery was less than 50%. Furthermore, the cores obtained were often misleading, and, due to great expense, only a small part of the hole was cored in the zone that immediate production was expected, and no great amount of information was obtained.

It will be seen, therefore, that there are a large number of wells in different established oil fields in which there is little or no information on the locations of oil sands and shales or their elevation at the point penetrated by such wells.

I have invented a method and apparatus which may be used on wells in which the well casing has been installed for determining the locations of the strata between the lower end of the casing and the surface of the ground. In using my invention it is possible to obtain information by which the location of the various shales and sands may be located, and with this information it is possible to perforate the well casing at such a point that oil sands will be communicated with the well and the well put on production.

It is an object of my invention to provide an electrical method of and apparatus for locating sands and shales in a well in which the casing has already been installed.

It is a further object of my invention to provide a method and apparatus of this character which involves absolutely no mathematical computations or calculations to obtain or use the information which is given in the performance of my invention.

It is another object of my invention to provide a method and apparatus in which the apparatus during the performance of the method produces a chart which of itself, and without mathematical computations, indicates the locations of sands and shales.

It is a further object of my invention to provide a method and apparatus for locating strata in a well in which the casing member which is placed in the well and an electrode installed in the earth a distance from the well, and also the intervening earth, are employed as an E. M. F. cell, and in which the electrode is electrically connected to different portions of the casing member externally of the earth to complete the electrical circuit including the E. M. F. cell, and in which changes in voltage, amperage, or other electrical phenomena or electrical characteristics are indicated, measured, or determined. It has been found that electrical characteristics change as the connection with the casing member is changed, with the result that a curve may be plotted having peaks, which peaks indicate certain formations.

It is a still further object to provide a method and apparatus for locating strata in which two E. M. F. cells are formed, one cell being formed by the casing member and electrode installed in the earth and the intervening earth, and the other E. M. F. cell being formed by an electrode placed in the well, the casing member, and the liquid between the casing member and the well electrode, in which the ground electrode and well electrode are connected together, and in which the changes in electrical characteristics which occur when the well electrode is moved along the well are indicated, measured, or determined.

It is a still further object of my invention to provide a method and apparatus in which an earth electrode is installed in the earth a distance from the well and is electrically connected to different portions of the casing member so that the current flow between the earth electrode and the different portions of the casing member may be indicated, measured, or determined.

It is a still further object of my invention to provide a method and apparatus in which an earth electrode is installed in the earth a distance from the well and is electrically connected to different portions of the casing member so that the potential difference between the earth electrode and the different portions of the casing member may be indicated, measured, or determined.

My invention is susceptible of embodiment in many diffrent forms, all of which incorporate the essential features of my invention. It is found in practice that certain wells may advantageously employ a slightly different set-up of apparatus. However, in each instance the apparatus incorporates the essential and fundamental elements of my invention.

In the following description I will describe in detail the apparatus which I have found through experimenting and tests to be most successful of general application, and during the course of the description will point out the various additional features and advantages and objects of the invention in addition to those which I have set forth heretofore; and I will also describe other forms of my invention which have been tested and used on various wells and which have certain features and advantages which will also be pointed out in the description.

Referring to the drawings:

Fig. 1 is a diagrammatic view illustrating the apparatus of the preferred form of my invention and which performs the preferred process of my invention.

Fig. 2 is a fragmentary diagrammatic view showing a recording device which produces a record or chart of the formations and their locations in the well.

Fig. 4 is a fragmentary view illustrating an alternative form of well electrode which may be used in conjunction with the apparatus of my invention.

Figure 3:
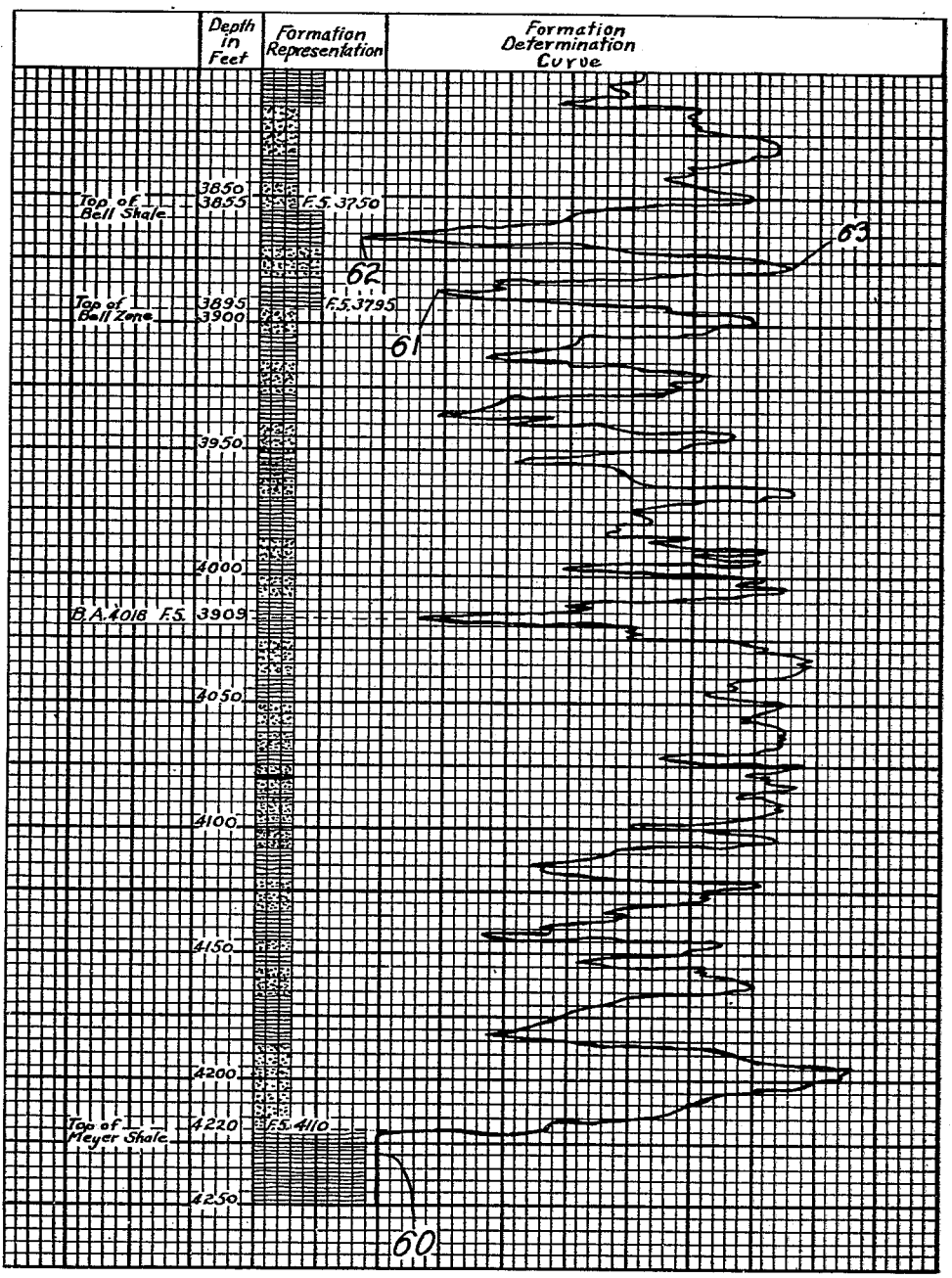
Fig. 3 is a view showing a record or chart which was made by apparatus corresponding to that diagrammatically illustrated in Fig. 1 and which was used for locating the oil bearing strata in Union Oil Company of California well, Farwell No. 4, located at Santa Fe Springs, California.

Figs. 5 to 13 inclusive are views illustrating different forms of apparatus which incorporate the features of my invention and which I may use in practicing my invention.

In Fig. 1, the numeral 11 represents a well which has been drilled to an oil bearing formation indicated at 12. When this well was drilled a well casing 14 was set in the well. The lower end of this well casing 14 is shown as being provided with a casing shoe 15 which has been cemented in a layer of shale 16 in order to seal from the well 11 all of the oil and water bearing formations above the shoe 15.

The apparatus of my invention includes what I term an "external casing circuit." The external casing circuit includes a conductor 18 which is connected to the well casing 14 as indicated at 19. At a point preferably at a distance from the well 11 is a ground 20 to which the conductor 18 is connected. In the conductor 18 is a recording device generally designated by the numeral 21 and which will be described in detail later. The external casing circuit also includes a balancing circuit or shunt circuit 22 having a battery or other source of electrical energy 23 and an adjustable resistance 24.

My invention also includes what I term an "external well circuit." This external well circuit includes a ground 26 which is preferably situated in the ground at a distance from the well 11. Connected to this ground 26 is a conductor 27 which has a portion thereof wound on a drum 28. The conductor 27 extends over a sheave 29 and into the well 11 and has an electrode 30 secured to the lower end thereof. The external well circuit includes a battery 32, a resistance 33, and a meter 34 whereby the voltage or amperage of the current flowing through the external well circuit may be observed.

In the illustration of my invention in Fig. 1 the well 11 is shown as containing an electrolyte 36, such as salt water which is ordinarily found in a well, and therefore the electrode E which I prefer to use is of the type to form the plate of a voltaic cell and is provided with centralizing arms 37 to hold it in substantially a central position in the well.

The recording means 21 which I provide as a part of my invention is diagrammatically illustrated in Fig. 2. Referring to this figure, there is a meter 40 which includes the standard mechanism of a voltmeter or ammeter. In the form of my invention illustrated I use a millivoltmeter. This meter 40 has a dial or face 41 and has a pointer 42 which is connected with the internal mechanism of the meter 40. Extending from this pointer 42 and adapted to move therewith is an arm 43 which carries a stylus 44. Supported on a shaft 46 is a drum 47 which is adapted to carry a sheet of graph paper 48 with which the stylus 44 is in recording relation. Connected to the shaft 46 is a flexible shaft 50 which extends to and is operatively connected to a sheave 51 which engages the portion of the conductor 27 between the drum 28 and the sheave 29. By this last mentioned means the drum 47 is rotated in synchronism with the lineal movement of the conductor into and out of the well so that the position of the drum and the graph paper thereon corresponds to the position of the electrode 30 in the well in place of the recording means 21 which I have illustrated and a standard recording meter may be used.

The form of apparatus disclosed in Fig. 1 constitutes one which I have found to be very satisfactory in locating formations in a well. In the apparatus of Fig. 1 the electrode 26 is preferably located a distance of about 125 feet from the well 11 and the electrode 20 is located at a distance of about 125 feet from the electrode 26 and 250 feet from the well 11. It is conducive to more distinct recording to locate these two grounds 20 and 26 at such points that there will be a minimum of electrical interference to the flows of currents and the voltages in the circuits, and this should be done even though it is necessary, for example, to place the two grounds 20 and 26 closer together or to place them closer or farther from the well 11. For example, it is desirable to keep these two grounds away from any surface piping which form conductors and which in an oil field would ultimately lead to the well being tested.

There is a potential difference between the electrodes and well casing, and when an electrical connection is made externally of the earth there will be a current flow from the high potential to the low potential electrode. In using the form of my invention which employs batteries for assisting in producing voltages or current flows I find it more satisfactory to arrange the apparatus so that the flow of current through the external circuit is in harmony with rather than in opposition to the currents generated in the earth, and which may be generally designated as internal circuits or current flows as distinguished from external circuits or external current flows. In fact, in this apparatus I am able to use the internal flows of current in its operation.

Since the well casing 14 has already been installed in the well and is made of iron, it is desirable to form all of the other electrodes and grounds such as 20, 26, and 30 of opposite electropotentials so that, as pointed out heretofore, the flows of current and potential differences between the electrodes and casing will be produced.

The well casing 14, the electrode 30, and the electrolyte 36 constitute a voltaic or E. M. F. cell and produce an electrical potential and electrical current which flows through the external well circuit and also through the ground which comprises the internal well circuit. It is, therefore, desirable to form the electrode 30 from a metal which is electro-positive with respect to the iron casing 14 such, for example, as zinc. The ground 26, the casing 14, and intervening earth may also constitute an E. M. F. cell and it is, therefore, desirable to form the ground or electrode 26 from a metal which is electro-negative with respect to the iron casing 14 so that the two cells may work together, and therefore this ground 26 may be made from any of a number of metals such as nickel, lead, tin, copper, silver, antimony, or gold.

With the electrodes so formed when the well circuit, including the external well circuit and the internal well circuit, is completed there will be a flow of current from the electrode 30 through the electrolyte 36 to the casing 14, from the casing 14 to the ground 26, and from the ground 26 through the conductor 27 through the various apparatus, and from thence into the well to the electrode 30. It should be strictly understood, however, that this direction of flow is not essential but merely desirable. It would be possible to reverse the direction of flow by either changing the electropotentials of the electrodes 26 and 30 of this circuit or by providing a source of energy in the conductor 27 greater than that generated in the earth and in opposition thereto which would cause a flow of current in the direction reverse to that just described.

In the casing circuit which includes the external and the internal circuits, the casing 14 and the ground 20 constitute electrodes of an E. M. F. cell, and it is preferable to make the ground or electrode 20 from a metal which is electro-positive with respect to the iron casing 14 and metals such, for example, as zinc may be used. A further reason for making the ground 20 electro-positive is that the ground 26 is electro-negative with the result that there is a potential difference between the ground 20 and the ground 26 which produces an additional flow of current which has been found to be of value in obtaining readings from the recording device 21 which are very distinct in character and which very clearly show up the different formations in the well. The flow of current in the casing circuit, both external and internal, is as follows. The electricity flows from the electrode 20 through the earth to the casing 14 and from the upper end of the casing through the conductor 18 to the ground 20. There is also a flow of current from the ground 20 through the earth to the ground 26 and this current flows through the conductor 27 in the same direction as the flow of current previously described with respect to the well circuit. As is true in connection with the well circuit, it is possible in the casing circuit to make the electrode 20 electro-negative with respect to the casing 14 and to produce a flow of current in the opposite direction.

The superior results of the preferred form of my invention are obtained by reason of the influence of one flow of current on the other flow of current or of the potentials of one circuit on the other, and although better results are obtained when the flows of current are in the direction indicated in Fig. 1, satifsactory readings may be obtained by reversing either or both of the current flows.

It is possible in my invention to place the recording device 21 in the well circuit and by using the well circuit alone to obtain a record which will indicate the location of the sands and shale. However, it is found that the earth currents for some reason give a little more interference to the currents flowing through the well circuit, and therefore I prefer to employ both the well circuit and the casing circuit and place the recording device 21 in the casing circuit because the record which is produced is a little more distinct in its indications.

I will now refer to Fig. 1 and describe the method followed in installing the apparatus of my invention shown therein and the method in which the record, as illustrated in Fig. 3, is obtained.

When it is desired to make a test and determination of the sands and shales in a well, I first install the grounds 20 and 26 in the locations shown in Fig. 1, the ground 26 being 125 feet, more or less, from the well, and the ground 20 being 250 feet, more or less, from the well. The two circuits are then connected to the grounds and casings and the electrode 30 is lowered into the well to a point opposite a particular shale or other known formation in the well. In the particular well illustrated the shale 16 is the one in which the shoe has been installed and is one which is known in the fields as being a particular body of shale. It sometimes happens that there is a particular oil sand in a well which is well established in the geological records for the particular field in which the well is situated, and therefore the electrode under such circumstances would be lowered to a point where the oil sand is located. The meter 34 is then observed and if the current flow is not 860 millivolts plus or minus 150 millivolts, the resistance 33 is operated either to increase or decrease the resistance in order to bring the reading to approximately 860 millivolts. The flow of current from the ground 20 to the casing 14 is then observed, this being done by disconnecting the shunt circuit 22. This voltage should be approximately 380 millivolts but may vary plus or minus 100 millivolts. If the millivoltage of this circuit is not within the range, it may be desirable to insert an artificial source of energy in the conductor 18, such as a battery, in order to increase this voltage. However, it is found that ordinarily this flow of current will be adequate without any batteries inserted in the conductor 18. It is only where the casing 14 is so old and corroded that there is very little chemical action that it is necessary to use a battery in the casing circuit. If the voltage is too high, resistance may be inserted to decrease it. The next determination which is made is the potential difference between the grounds 20 and 26. This should be approximately 970 millivolts with the ground 26 positive in the external circuit. If this voltage is not within 150 millivolts of this figure, the distance between the grounds 20 and 26 is then changed until the desired voltage between these two grounds is obtained.

The potential differences which have been pointed out have been determined through considerable experimentation as being productive of the best results. It should be strictly understood that the invention is not to be limited to these potential differences or corresponding current flows in various circuits, since records can be obtained using other voltages, currents, and other relationships between the various circuits. However, conditions may exist in which it would be desirable to use other potentials, currents, and other relationships of the parts.

I have given the voltages, spacing of the parts, and relationship of the parts which I have found to be the most efficient in actual practice not to place limitations on the invention but solely in order that this specification may teach those skilled in the art of the manner in which I believe to be the best mode of practicing my present invention.

After the parts have been so positioned and the voltages adjusted as pointed out heretofore, the next step is to balance or adjust the voltage in the external casing circuit in order that the chart produced on the graph paper 48 will be in a centralized position. The shunt circuit 22 is therefore connected and the resistance 24 is adjusted so that the stylus 44 is set in a desired position on the graph paper 48. The apparatus is now ready for making the record which is done by winding up the drum 28 very slowly and raising the electrode 30. As the drum 28 is wound up the small drum 47 carrying the graph paper 48 is rotated in accordance therewith. Furthermore, as the electrode 30 is raised there will be a fluctuation in the flow of current through the casing circuit and through the conductor 18 with the result that the meter 40 will be operated in accordance therewith which will move the pointer 42 and arm 43 and will cause the stylus to move to the right or left relative to the graph paper 48 as shown in Fig. 2. When the top of the well is reached the graph paper 48 may be removed from the drum 47 and it will be found that a line has been placed thereon as shown in Fig. 3, and from this chart it is possible to locate shale and sand formations, as will be pointed out shortly.

When the apparatus is set up and in operation, as previously described, there is a flow of current through the conductor 27 from the ground 26 to the electrode 30, and therefore it must be assumed that to complete the circuit there must be a flow of current through the earth from the electrode 30 to the ground 26. There is also a flow of current through the conductor 18 from the top of the casing 14 to the ground 20, and it must therefore be assumed that this electrical circuit is completed by a flow of current from the ground 20 through the earth to the casing 14. I have furthermore determined that there is a flow of current through the earth from the ground 20 to the ground 26, this being determined by making a test in the external circuit. I therefore believe that in the performance of my invention there are at least three flows of currents in the ground. There is one flow of current from the electrode 30 to the casing 14 and to the ground 26; there is another flow of current from the ground 20 to the casing 14; and there is a third flow of current from the ground 20 to the ground 26.

When the electrode 30 is in different positions in the well the electrical characteristics (which term I use to broadly identify either a change in voltage, amperes, or both) in both of the conductors 18 and 27 change and there is a definite cause and effect relationship between the current flows or voltages of the two conductors. It appears that whenever the electrode 30 is opposite a shale there are certain electrical characteristics in the conductors 18 and 27, and that when the electrode 30 is opposite a sand there are certain other electrical characteristics in the conductors 18 and 27. Experience has indicated that these different electrical characteristics accurately indicate the type of formation which is directly adjacent the electrode 30 and this holds true with such accuracy that I am able to obtain a record, as shown in Fig. 3, which can be used by geologists to locate oil bearing sands and to therefore find the level at which the casing 14 should be perforated in order to obtain oil.

I am not certain as to just how the formation adjacent the electrode 30 varies the electrical flows or voltages in the conductors 18 and 27, but I believe that it influences these current flows or voltages because of the difference in physical, electrical, or electro-chemical, or electro-kinetic properties of the different types of formations. It is, of course, well known that batteries or voltaic or E. M. F. cells have internal resistance. In the ground the casing 14 acts as one plate, while the grounds 20 and 26 act as other plates of the battery. The intervening earth constitutes an electrolyte and there is a chemical action between these two elements. The point at which the electrical flow or voltage passes to the casing 14 is determined by the position of the electrode 30, which in turn determines the formation through which the current must flow into the surrounding earth or determines the formation which will have its effect on the external flows of current or potential differences between the electrodes. Since (it is believed) the electrical flow diverges and spreads quite rapidly after it enters the earth, the physical, electrical, or electro-chemical, or electro-kinetic properties of the material located immediately adjacent the electrode 30 may affect the current flows or voltages in the conductors 18 and 27, even though this material with the electrodes also acts as a battery in generating a current through the earth.

Referring now to Fig. 3, I have illustrated a graph which is produced by the recording device 21 of my invention. This graph or chart is a reproduction of a portion of a chart from 3800 feet down to 4250 feet in the Union Oil Company well, Farwell No. 4, located at Santa Fe Springs, California. In this well the shoe 15 of the casing 14 was set at 4250 feet in a substantial shale in the oil field which is known as the Meyer shale. When the apparatus was first installed in the well the voltage in the casing circuit 18 was adjusted so that the shale was indicated by the peak 60. All of the peaks in the chart line which point to the left indicate shale formation, and all of the peaks which point to the right indicate sand formation. At a level of 3855 feet to 3895 feet a shale known as the Bell shale was located. This shale is a well established marker in this field and was identified because of its size and because it has a layer of sand in it. This Bell shale is indicated on the chart by the two peaks 61 and 62 separated by the peak 63 which indicates the area of sand in this Bell shale. All of the shales and sand between the Meyer shale and the Bell shale are indicated and located by the peaks to the left and the peaks to the right. In a well located near Farwell No. 4, and which is known as Farwell No. 5, the top of the Bell shale was located at 3750 feet and the bottom of the Bell shale was located at 3795 feet. This, therefore, indicated the slant of the Bell shale formation between these two wells. In Farwell No. 4 in which the record Fig. 3 was made, the top of the Meyer shale was 4220 feet, while in the adjacent well, Farwell No. 5, the top of the Meyer shale was 4110 feet below the surface of the ground. This, therefore, enabled a determination of the inclination of the Meyer shale.

As pointed out heretofore, in the method and apparatus of my invention the record made by the recording device 21 is a complete and final record which may be used for determining where the well casing should be perforated. It is not necessary to make any mathematical computation or calculation in order to locate the various shale or sand. All that is necessary is to remove the record 48 and to examine the lines drawn thereon by the stylus. In view of the correlation between the position of the drum and the position of the electrode 30 the depth below the surface of the ground of each of the peaks in either direction is indicated directly on the chart.

If the invention is to be used in a well in which there is no electrolyte, such as 36, or in which the fluid level is below the portion of the well where the determination is to be made, an electrode of the type shown in Fig. 4 may be attached to the lower end of the conductor 27. This electrode which I will designate by the numeral 65 includes a plurality of spring arms 66 which are in electrical contact with the conductor 27. These spring arms 66 make electrical contact with the well casing 14 and preferably have sharp edges 67 at the middle portions of the arms 66 where engagement is made with the casing 14 so that good electrical contact may be obtained. When this type of electrode is used there will, of course, be no voltaic cell provided in the well and the battery 32 of the conductor 27 must be of sufficient voltage and amperage to produce the desired flow of current and voltage in the well circuit.

I will now refer to Figs. 5 to 13 inclusive in which I have illustrated some of the electrical hook-ups which may be used in practicing my invention.

In Fig. 5 I illustrate a form of my invention which has proved to be of considerable value in obtaining a very satisfactory record or chart from the recording device 21. As pointed out heretofore, it is desirable to have a certain potential difference between the grounds 20 and 26 so that there will be the desired flow through the ground from the electrode 20 to the electrode 26 and through the well circuit and the casing circuit. I have found that this difference in potential, if not correct, may be compensated for by use of a shunt circuit, and therefore the necessity of resituating either of the grounds 20 or 26 is avoided. Such an arrangement is disclosed in Fig. 5. In this figure the same arrangement of parts is shown as illustrated in Fig. 1 except that the battery 32 and the adjustable resistance 33 are not employed in this hook-up. Furthermore, the drum 28, sheave 29, and the other parts are not illustrated because Fig. 5 is highly diagrammatic. Connected to the conductor 18 at a point adjacent the ground 20 and also to the conductor 27 at a point adjacent the ground 26 is a conductor 67 having an adjustable resistance 68. By using this device a portion of the electric flow which would ordinarily pass through the formation is shunted directly from one ground to the other through the conductor 67, and in this way the effect of the difference in potential between the grounds 20 and 26 on the external well circuit and the external casing circuit is modified so that the resulting effect is the same as is obtained by resituating the grounds 20 and 26.

Fig. 6 shows an arrangement similar to that illustrated in Fig. 1 except that in place of having a separate ground 20 and 26 for each of the conductors 18 and 27 there is provided but a single ground 70 to which both conductors 18 and 27 are connected.

Fig. 7 shows a form of my invention in which both of the conductors 18 and 27 are connected to a single ground 70. In this form of the invention the recording device 21 is placed in the conductor 27 and a resistance 71 is placed in the conductor 18. This resistance 71 is of use in those installations in which the flow of current in the casing circuit is too high and it becomes desirable to insert resistance to cut it down. This is desirable because I have found that the relationship between the current flows or the voltages in the various circuits, as pointed out heretofore, should be in the neighborhood of those stated to produce the best results.

Fig. 8 illustrates a form of my invention which is identical to that shown in Fig. 6 except that the battery and resistance have been removed from the well circuit 27. This type of hook-up may be used where the flow of current through the well circuit 27 is at the right value or the voltage is at the right value and needs no alteration.

Fig. 9 illustrates the form of my invention in which the two conductors 27 and 18 employ a single ground 70 and in which the conductor 18 is provided with a battery 73 and resistance 74 in series. This hook-up is used where the current flow or voltage in the casing circuit 18 is below the desired minimum and it becomes necessary, therefore, to increase the voltage or current flow so that the most satisfactory relationships may be maintained.

Fig. 10 resembles Fig. 9 except in place of having the battery 73 and resistance 74 in series these two parts are placed in a potentiometer relationship to the circuit 18, as indicated at 75. In this form of the invention, as in Fig. 8, there is no balancing of either of the circuits and the readings or records may be made from either of the meters of the recording devices 21 or 21a.

Fig. 11 illustrates a form of my invention in which the conductor 27 is connected to the conductor 18 at a point 76 and in which a meter 77 is placed in the conductor 18 between the point 76 and the ground 70. In this form of the invention the meter 21 has a shunt circuit including the battery 32 and resistance 33 for balancing the well circuit.

Fig. 12 illustrates a form of my invention in which the conductors 18 and 27 are connected to a single ground 70 and include meters 21 and 21a, from either of which the records may be taken. The conductor 18 includes a resistance 79 which is used when the flow of current through the conductor 18 is too heavy and must be reduced in order to obtain the desired relationship between the current flows or voltages.

Fig. 13 illustrates a form of the invention in which the conductor 27 is connected to a ground 80 located on the opposite side of the well from the ground 81 of the conductor 18. In this form of the invention the recording is made by the meter 21 and the conductor 18 includes a battery 83 and resistance 84. There is a shunt circuit 85 having an adjustable contact 86 which may be positioned as desired with relation to the resistance 84.

All of the apparatus illustrated in Figs. 5 to 13 incorporate the essential features of my invention in the various combinations which may be employed in actual practice. It will be seen that all of the apparatus disclosed herein and each of the methods disclosed herein employ the basic principle of my invention which resides in the use of the casing member 14 and ground 26 as the electrodes of an E. M. F. cell and the intervening earth as the electrolyte, or utilizes at least a portion of the intervening earth for its electrolytic properties, and in the electrically connecting of the ground 26 to different portions of the casing 14. The circuit, including the ground 20, the conductor 18, and the casing 14, is employed for the reason that more pronounced indications are obtained by taking readings in this circuit, but in certain types of formations fair readings may be obtained without the use of the casing circuit and the circuit may be dispensed with. However, I find that superior results may be obtained where the casing circuit is employed. I do not wish my invention to be limited to any precise connection between the elements, but desire that the apparatus claimed should be broadly construed to cover the combination which I have produced in its broadest aspect and equivalency, and desire the method claims to be broadly construed as covering the series of steps in their most inclusive aspects. For example, the well casing 14 may be a special casing member or pipe installed particularly for the purpose of acting as an electrode for the purpose of making the test and could thereafter be removed from the well. The term "well casing" or "casing member" therefore refers to a member which is either permanently or temporarily placed in the well.

The indicator or recorder which I prefer to use in the practice of my invention is a millivoltmeter which measures the voltages and changes in voltages which occur when the electrode 30 is moved into different positions in the well. However, amperes, current flow, resistance, or other electrical values may be measured. Likewise, the electrical values of these different types which are produced in the external circuits may be produced as a result of or may be affected by the current flow, voltage, resistance, impedance, condenser effect, etc. in the formation along side of the electrode 30 or the formations adjacent thereto. Obviously, my invention is not limited to the indicating, recording, or determining of any particular type of electrical values which is produced during the performance of the method of my invention, and therefore I employ the term "electrical characteristics" as inclusive of these different electrical values which exist or may be measured. The term "electrical characteristics" therefore is intended to mean the voltage, amperage, resistance, impedance, condenser values, or other electrical phenomena which may be measured, indicated, recorded, or determined in order to obtain information whereby a curve, such as shown in Fig. 3, may be developed.

I claim as my invention:

1. An apparatus for locating strata in a well having a casing therein, the combination of: a casing circuit including a ground connection of opposite electro-potential relative to said casing, and an external conductor connected to said ground connection and said casing; a well circuit including an electrode movable in said well, a ground connection of opposite electro-potential relative to said electrode, and an external conductor connected to said ground connection and to said electrode; means for electrically connecting said circuits; and electrical measuring means for one of said circuits.

2. An apparatus for locating strata in a well having a casing therein, the combination of: a casing circuit including a ground connection of opposite electro-potential relative to said casing, and an external conductor connected to said ground connection and said casing; a well circuit including an electrode movable in said well, a ground connection of opposite electro-potential relative to said electrode and also to the ground connection of said casing circuit, and an external conductor connected to said ground connection and to said electrode; means for electrically connecting said circuits; and electrical measuring means for one of said circuits.

3. A method of determining the location of strata in a well in which there is placed a casing member, the steps of: electrically connecting the earth, at a point spaced from said well and the casing member, with an electrode in said well within said casing member; moving said electrode in said well; and determining the changes in electrical values which occur between the electrode and the point of connection to the earth and the casing member when said electrode is so moved.

4. A method of determining the location of strata in a well in which there is placed a casing member, the steps of: electrically connecting the earth, at a point spaced from said well and the casing member, with an electrode in said well within said casing member; moving said electrode in said well; and determining the changes in voltage which occur between the electrode and the point of connection to the earth when said electrode is so moved.

5. A method of determining the location of strata in a well in which there is placed a casing member, the steps of: forming an external circuit between the casing member and an earth connection; forming a second external circuit between an electrode in the casing member and said earth connection; moving said electrode in the casing member; and measuring electrical values in at least one of said external circuits for different positions of said electrode.

6. A method of determining the location of strata in a well in which there is placed a casing member, the steps of: forming an external circuit between the casing member and an earth connection; forming a second external circuit between an electrode in the casing member and said earth connection; employing electrolyte in the casing member to cooperate with said electrode and the casing member to form an E. M. F. source; moving said electrode in the casing member; and measuring electrical values in at least one of said external circuits for different positions of said electrode.

7. A method of determining the location of strata in a well in which there is placed a casing member, the steps of: forming an external circuit between the casing member and an earth connection; forming a second external circuit between an electrode in the casing member and said earth connection; inserting a source of energy in at least one of said external circuits; moving said electrode in the casing member; and measuring electrical values in at least one of said external circuits for different positions of said electrode.

8. A method of determining the location of strata in a well in which there is placed a casing member, the steps of: establishing an external flow of current between the casing member and an earth connection; establishing an external flow of current between an electrode in the casing member and said earth connection; moving said electrode in the casing member; and measuring electrical values in at least one of said current flows for different positions of said electrode.

9. A method of determining the location of strata in a well in which there is placed a casing member, the steps of: forming an electrical circuit including an electrode in the casing member, a connection to the upper part of the casing member, and a connection to the earth; moving said electrode in the casing member; and measuring electrical values in said circuit for different positions of said electrode.

10. A method of determining the location of strata in a well in which there is placed a casing member, the steps of: forming an electrical circuit including an electrode in the casing member and a connection to the upper part of the casing member; grounding said electrical circuit to the earth; moving said electrode in the casing member; and measuring electrical values in said circuit for different positions of said electrode.

11. A method of determining the location of strata in a well in which there is placed a casing member, the steps of: forming an external circuit between the casing member and an earth connection; forming a second external circuit between an electrode in the casing member and a second earth connection; electrically connecting said external circuits; moving said electrode in the casing member; and measuring electrical values in at least one of said external circuits for different positions of said electrode.

12. In an apparatus for locating strata in a well in which there is placed a casing member, the combination of: an external circuit including an earth connection, and a conductor connected to said earth connection and the casing member; a second external circuit including an electrode movable in the casing member, and a conductor connected to said electrode and said earth connection; means for moving said electrode in the casing member; and measuring means associated with at least one of said external circuits.

13. In an apparatus for locating strata in a well in which there is placed a casing member, the combination of: an external circuit including an earth connection, and a conductor connected to said earth connection and the casing member; a second external circuit including an electrode movable in the casing member, a second earth connection, and a conductor connected to said electrode and said second earth connection; means electrically connecting together said external circuits; means for moving said electrode in the casing member; and measuring means associated with at least one of said external circuits.

14. In an apparatus for locating strata in a well in which there is placed a casing member, the combination of: an external circuit including an electrode movable in the casing member, and a conductor connected to the casing member; a ground connection; means connected to said external circuit and to said ground connection grounding said circuit to the earth; means for moving said electrode in the casing member; and measuring means connected to said external circuit.

GEORGE H. ENNIS.